April 27, 1937.  H. T. WHEELER  2,078,549
PROCESS FOR MAKING HELICAL ACCORDION PACKING RINGS
Original Filed April 19, 1932  2 Sheets-Sheet 1

Harley T. Wheeler
INVENTOR.
Jesse R. Stone
BY
Lester B. Clark
ATTORNEYS.

April 27, 1937. H. T. WHEELER 2,078,549
PROCESS FOR MAKING HELICAL ACCORDION PACKING RINGS
Original Filed April 19, 1932 2 Sheets-Sheet 2
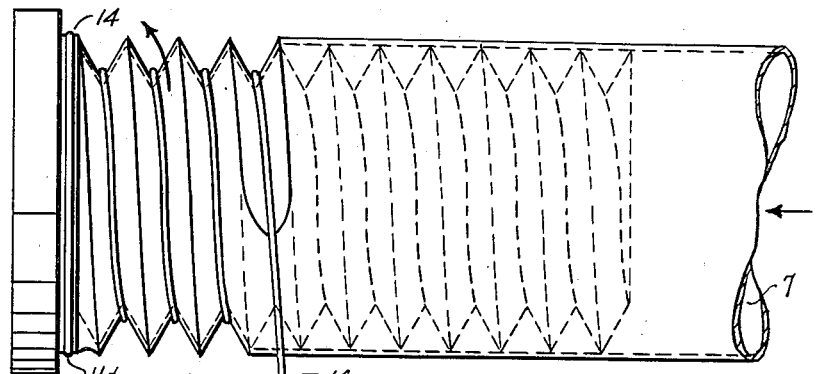
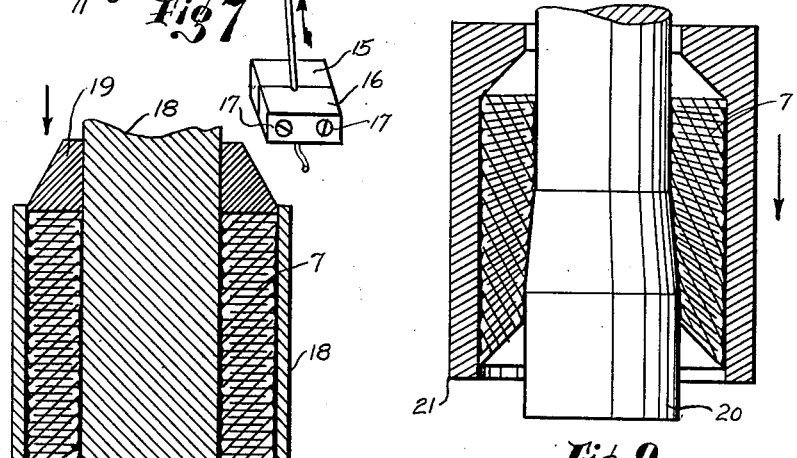
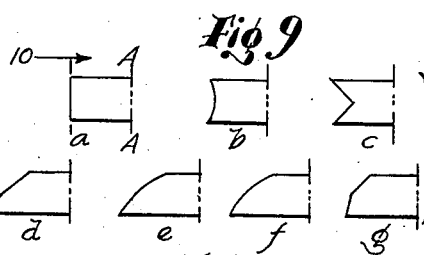
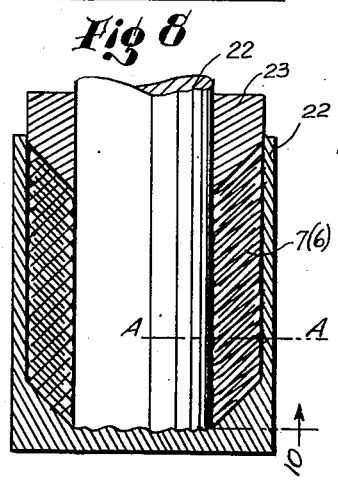
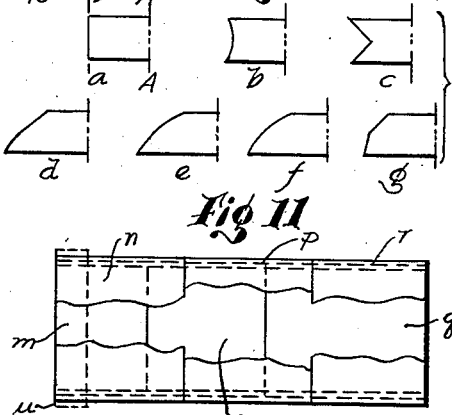
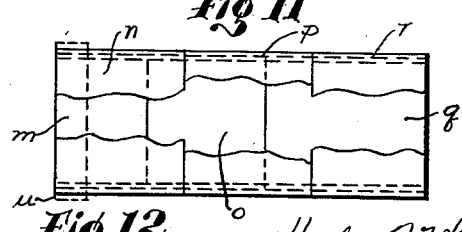
Harley T. Wheeler
Jesse R. Stone
INVENTOR.
BY Lester B. Clark
ATTORNEYS.

Patented Apr. 27, 1937

2,078,549

UNITED STATES PATENT OFFICE 2,078,549

PROCESS FOR MAKING HELICAL ACCORDION PACKING RINGS

Harley T. Wheeler, Dallas, Tex.

Original application April 19, 1932, Serial No. 606,115. Divided and this application October 13, 1933, Serial No. 693,452

13 Claims. (Cl. 154—2)

My invention relates to a process of manufacture of an accordion-shaped packing ring.

It is an object of the invention to provide a complete set of packing capable of being made of one piece of material.

Another object is to provide a one-piece packing member having no joints or laps between any of the laminations throughout the assembly, regardless of the length of the packing member.

It is a further object to provide a process of constructing packing which is adaptable for making any shape of packing ring.

It is a further object to provide a packing member for stuffing-boxes and the like which may be produced rapidly and at a very low cost.

Another object is to provide a process of making packing of uniform density.

A further object is to provide a method of making packing which will result in a packing member having continuous folds which are mechanically strong and adapted to build up local saturation which operates automatically to increase the packing effect independent of manual adjustment.

With the foregoing objects and advantages in view, other factors of construction will now be disclosed, accompanied by the drawings, wherein:

Figs. 2 and 2a show side and end views respectively of a commercial woven tubular section of material for making this accordion.

Figs. 3 and 3a show end and side views respectively of a fabricated tubular section of material formed on the bias.

Fig. 7 shows the method of forming the helical accordion by feeding a section of tubing onto the mandrel.

Fig. 8 shows the method of tamping the helical accordion into a radial mass formation.

Fig. 9 shows the method of changing the radial accordion into a conical shape.

Fig. 10 shows the method of compressing the accordion to a conical ring shape of definite dimensions.

Fig. 11 indicates some of the ring shapes which may be produced.

Fig. 12 shows a composite tubular section for controlling density, or porosity of porous materials.

This application is a division of my prior application filed April 19, 1932, Serial No. 606,115.

One of the largest uses of packing is on gate valve stems, the majority of which are non-rising, or rotatable types. The ideal packing for the purpose is a one-piece set, such as is herein described. Another large use is on plunger pumps, as the plunger may be removed for insertion of the one-piece set. There are many other uses for this type of accordion packing.

Figure 1:
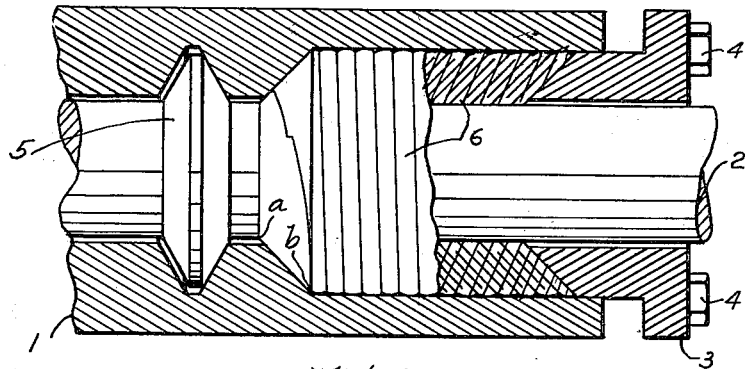
Fig. 1 shows the cross-section of a gate valve bonnet showing the use of the packing made according to this invention.

Referring now to Fig. 1, the cross-section of the bonnet of a gate valve, the stuffing-box is bored in the housing 1. The valve stem 2 extends through the housing 1 and has a boss 5 fitting into the housing. The packing gland 3 is held in place by bolts 4, 4, attached to the housing by bugs not shown, and adjusts the one-piece accordion 6 in place to hold pressure in the valve chamber.

The accordion packing 6 is a great improvement on all other types of strip wound rings cemented or vulcanized together; braid packing cut and formed into rings, and for some purposes better than the radial lappen accordion packing disclosed in my application relating to saturation by syntheses, Serial No. 600,246. As pressure penetrates through the laminations of the packing 6, a small drop of pressure occurs across each lamination causing the conical surfaces to contact with the stem 2. In most packing construction this thrust action would cause contact between the fabric and the rod and result in excessive wear. In the accordion, however, a high saturation is built up around each fold which creates a saturated film of liquid, gas or vapour as the case may be, to exist at the point of contact, thus greatly reducing friction.

Another distinctive advantage of the accordion is that the absence of cements or binders between the laminations permits a slight difference of pressure to cause reaction, the plaits expand both lengthwise and between the wall and the rod surfaces.

Also, inasmuch as the assembly is saturated with the fluid medium under pressure the laminations are retarding agents sensitively changing position with the variation of pressure. The accordion is the tighest form of packing yet devised at either high or low pressure, or during the variation of pressure or in cases of misalignment.

Figure 2:
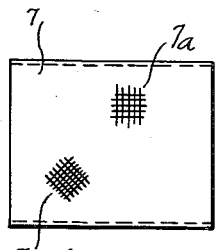
Figure 3:
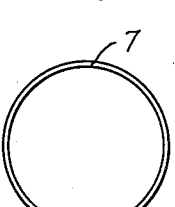
Figure 3:
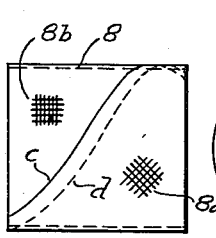
Figure 4:
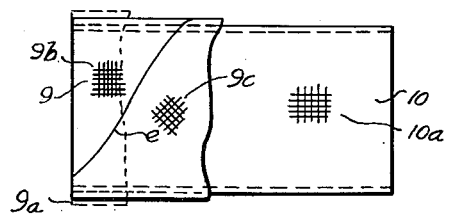
Fig. 4 shows a wrap of sheet material superimposed on a tube, making a composite tubular section.

The accordion as herein described necessarily has a tubular base. Fig. 2 and Fig. 2a show a woven tube of suitable material having a thin wall as indicated by the dotted lines. The warp of this commercial tubing 7 may be made to run on the bias as shown at 7b, or it may be made running lengthwise and being crossed at right angles by the woof, a network substantially as shown by 7a causes the density of the accordion to be greatest at the outer portions, as will be elsewhere shown. Fig. 3 and Fig. 3a indicate how a sheet of porous or absorbent material 8, which may be woven longitudinally as shown at 8b or may be cut on the bias as shown by the network at 8a, is wound spirally onto a mandrel and made into a lapped tube, with overlaps as at c and d being held by a suitable cement. The result of a tube so formed on the bias gives a uniform density of the completed accordion, as will be explained. Fig. 4 is an example of a composite tube, the inner section 10 being a commercial woven tube similar to that of Fig. 2, on which is formed a spiral tube 9 similar to that of Fig. 3 with a lap e. A combination is thereby secured having a combination of two networks substantially as shown. As the diameter of the rod is increased requiring deeper accordion grooves, other layers of tubing may be added as shown at 9a.

Figure 5:
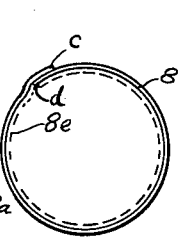
Fig. 5 shows an outline of the accordion folds to be made.
Figure 5:
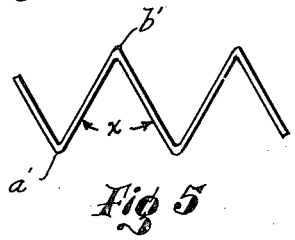

Returning now to Fig. 1, the packing set 6 is an assembly of 45 degree conical laminations, the slope length a b being the required length of one leg of the accordion to be formed. In Fig. 5 is an outline of this accordion opened up the length a' b' being made equal to a b Fig. 1. The angle x used for the primary formation is governed by the length a' b' in relation to the diameter of the stem 2, the curvature to which the material will be subjected and its porosity.

Figure 6:
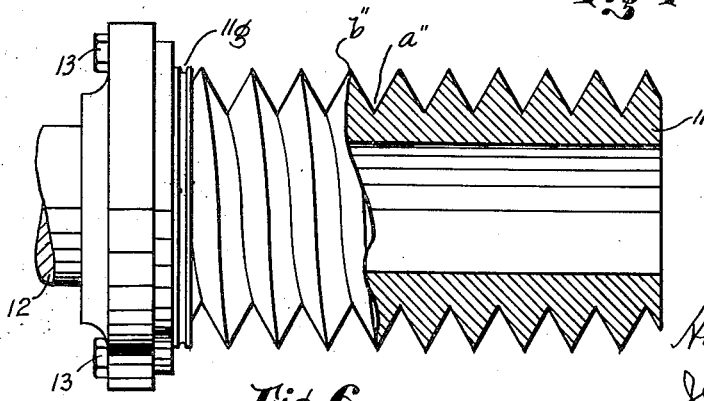
Fig. 6 shows a partial cross-section of the mandrel used to form the helical accordion.

A mandrel is used for forming the accordion and an example is shown in Fig. 6. A mandrel 11 is attached to a driving head 12 by the screws 13, 13. The surface of the mandrel 11 is formed into a helix similar to a V-thread, the included angle x and the length of the slope a'' b'' being the same as the values decided upon in Fig. 5. A groove 11g is made at the left hand portion of the helix.

The first step in forming my one-piece accordion is shown by Fig. 7, the helically ridged mandrel 11 being considered in place on a driving head for rotation as shown by the arrow. The woven tube 7, as fabricated according to Fig. 2, is pulled over the threaded portion of the mandrel 11 and is fixed to the latter by a wire 14 tightened around the groove 11g provided. Tension in the wire 14 is supplied by passing it through the clamps 15, 16 the latter held together and adjusted by the screws 17, 17.

The mandrel 11 is turned in a direction so that the wire 14 will pull the porous flexible tube 7 into the grooves gradually as the wire is pulled into the groove with the tube. As one end of the wire 14 is fixed to the mandrel 11 at the groove 11b each groove formed in the tube 7 as it is formed is held in place by the wire 14 and the helical shape is retained after the winding is completed. The operation pulls the warp into the V-shape and increases the density, but the woof is pulled apart in the troughs by the crushing.

After an accordion of sufficient length is obtained the wire 14 is removed and the helical fabrication screwed off the mandrel 11. Turning now to Fig. 8, the housing 18 is bored to the size of the stuffing-box of Fig. 1, which is approximately the outside diameter of the accordion as it is formed in Fig. 7. The annular space between the internal boss of the housing 18 is made equal to distance a' b' of Fig. 5, the slope of the grooves. Therefore, when the accordion is placed in the housing 18 and tamped with the collar 19 the folds occupy the annular space substantially as shown. No more pressure is applied during this operation than is necessary to bring the folds parallel.

My process of generating special shapes in the accordion must take into account a time lapse for making the transformation. For example, if the form made in Fig. 8 is directly transferred to the finishing mold of Fig. 10 and pressure applied, the conical laminations will be irregularly formed and the folds will roll unevenly on each other. To avoid the foregoing, the accordion 7 on being removed from housing 18 is placed in a housing 21 of the same outside diameter. The mandrel 20 has two diameters, the larger being that of the final or stem diameter and the smaller that of the internal boss of housing 18, Fig. 8. A tapered surface joins the two specified diameters. The housing 21, containing the accordion 7 is driven down over the mandrel 20, the tapered section gradually drawing and changing the folds into conical shape, the transformation being completed when the larger diameter passes through the last lamination.

The accordion 7 is now removed from the housing 21 and inserted in the mold 22, Fig. 10, having the bore of the stuffing-box of Fig. 1 and the stem being that of the stem 2 of the same figure. The punch 23 is forced against the fabric bringing the laminations to the desired angle and into parallelism and in close contact. It is a property of the accordion type of packing when properly pressed into final shape, that the folds will roll on each other sufficiently to make an exact fit against the confining walls. The completed packing set 7 (6) is now removed from the mold 22 and may be inserted in the stuffing-box of Fig. 1.

The conical accordion example as now completed is a 45 degree conical base. It should be obvious that many other shapes may be produced in like manner. Fig. 11 shows a series of shapes, each section being that portion of the forming mold 22 of Fig. 10, between the section line AA and the arrow (10). A radial accordion, square-ended is shown by a, the cupped formation by b and c is the V-shaped. My special shapes are the concave cone d, the convex-cone e, the concave-convex f and the frusto-cone g. The procedure of forming any of these shapes a to g inclusive is similar to the steps outlined in Figs. 9 and 10 after proper allowances are made in the tools necessary for formation.

A further application of the accordion process of constructing packing is shown in Fig. 12, the formation of a composite tube of varying densities. Portions m and n are of coarse material, for example, o and p of medium texture, while layers r and q are fine spun. The sections are overlapped substantially as shown and cemented together.

Returning now to Fig. 7, the accordion formation to tube 7 of the commercial tubing of Fig. 2, causes a concentration of the warp due to decreased diameter but a separation of the woof, as before mentioned. The finished ring therefore will be densest at the outer portions and more open at the inner points and contacting surfaces.

This adapts this accordion as correct construction for a stuffing-box ring as lubrication will be facilitated.

The use of a tube cut on the bias, such as Fig. 3, when the packing is finished a structure practically uniform in density, or porosity is produced, due to the sliding action of the fibers on each other. This type may therefore be used interchangeably for piston rings or stuffing-box types.

A composite material of Fig. 4 produces a well averaged structure and is useful for large diameters. When the composite structure of Fig. 12 is formed into an accordion packing the porosity is graduated in a lengthwise direction. Two or more sections may be used in forming the tubular assembly as shown by the dotted wrap $u$, and any number of density sections lengthwise as shown.

It should be obvious that forming of the helical accordion as herein described is a process of wide adaptation. Packing sets and rings for many uses made in various shapes and designs may be produced and such accomplishments as are thus possible are intended to be included under this invention and defined by the appended claims.

What is claimed is:

1. A method of forming packing comprising; placing a cylindrical tube of flexible packing material upon a mandrel corrugated transversely, winding a flexible line about said mandrel to force the walls of said tube into the corrugations of said mandrel and produce thereon approximately parallel laminations, removing said tube from said mandrel, and compressing said tube longitudinally to bring the adjacent sides of said laminations into close contact with each other.

2. The method of forming a packing set for stuffing boxes and the like comprising forming a cylindrical tube of flexible material, corrugating said tube transversely to form laminations therein, and compressing said tube longitudinally to bring the adjacent sides of said laminations into close contact with each other.

3. The method of forming a packing set for stuffing boxes and the like comprising forming a cylindrical tube of flexible material, corrugating said tube transversely to form laminations therein, and compressing said tube longitudinally to bring the adjacent sides of said laminations into close contact with each other and then distorting said laminations into frusto-conical shape.

4. A method of making packing comprising forming a tube of flexible material, placing the same upon a mandrel having a helical groove therein, compressing said tube into said grooves by winding a funicular member about said mandrel, removing said member, unscrewing said grooved tube from said mandrel, and then compressing said tube longitudinally to form accordion laminations therein.

5. A method of making packing comprising forming a tube of flexible material, placing the same upon a mandrel having a helical groove therein, compressing said tube into said grooves by winding a funicular member about said mandrel, removing said member, removing said tube from said mandrel, compressing said tube longitudinally to form transverse laminations therein, and then forcing the adjacent laminations into frusto-conical shape.

6. A method of forming a set of packing to fit a stuffing box and the like comprising forming a tube of flexible material, corrugating said tube transversely by forming a helical groove therein and compressing said tube longitudinally.

7. A method of forming a set of packing to fit a stuffing box and the like comprising forming a tube of flexible material, corrugating said tube transversely by forming a helical groove therein, compressing said tube longitudinally, and then increasing the inner diameter of said corrugated tube while maintaining the original outer diameter thereof to form laminations of frusto-conical shape.

8. A method of forming a set of packing to fit a stuffing-box and the like comprising forming a tube of flexible material, corrugating said tube transversely by compressing the wall of said tube into a helically formed groove, forcing the sides of adjacent laminations into close contact with each other, and then enlarging the inner diameter of said laminations to form frusto-conical shaped folds.

9. A method of forming a porous packing member comprising forming a cylindrical tube of fabric, forming transverse laminations in said tube, compressing said tube longitudinally to force the adjacent walls of said laminations into close contact and then distorting said laminations to incline the same relative to the longitudinal axis of said tube.

10. A method of forming packing including constructing a tube of fabric material with a plurality of layers of said fabric, forming regularly arranged transverse laminations in said tube and compressing said tube longitudinally to force the adjacent walls of said lamination into close contact with each other.

11. A method of forming packing including constructing a tube of fabric material with a plurality of layers of said fabric, forming regularly arranged transverse laminations in said tube and compressing said tube longitudinally to force the adjacent walls of said lamination into close contact with each other and then inclining said laminations relative to the axis of said tube.

12. A method of forming packing including winding a strip of fabric material helically to produce a tube of said fabric material, forcing the wall of said tube into uniform transverse laminations, and compressing said laminations longitudinally in the manner described.

13. A method of forming packing including forming a continuous tube of woven material, winding a helical strip of similar material upon said tube, forcing the wall of said tube into uniform transverse laminations, and compressing said laminations longitudinally in the manner described.

HARLEY T. WHEELER.